Aug. 13, 1940.   F. C. DOUGHMAN   2,211,006
ELECTRIC MOTOR
Filed Sept. 1, 1937
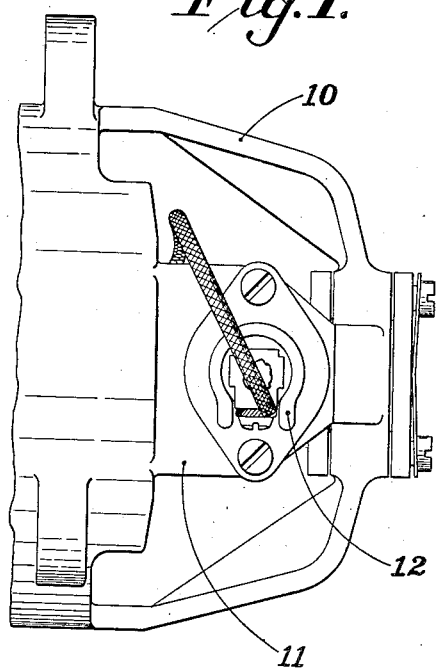
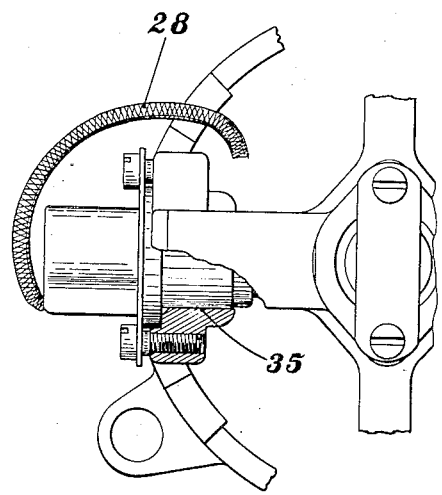
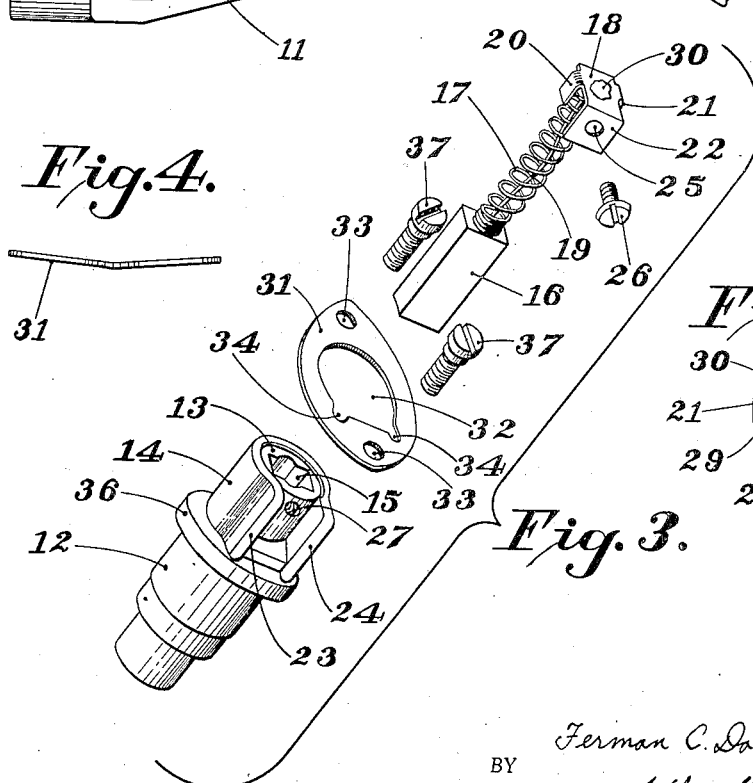
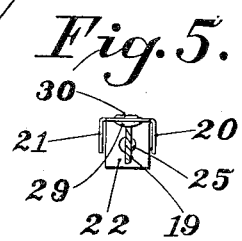
INVENTOR.
Ferman C. Doughman
BY Arthur G. Prangley
ATTORNEY.

Patented Aug. 13, 1940

2,211,006

UNITED STATES PATENT OFFICE 2,211,006

ELECTRIC MOTOR

Ferman C. Doughman, Stamford, Conn., assignor to Electrolux Corporation, Dover, Del., a corporation of Delaware Application September 1, 1937, Serial No. 161,929

7 Claims. (Cl. 171—324)

My invention relates to electric motors and more particularly to brush holders and supports therefor.

An object of my invention is to provide an improved brush holder and support which will lengthen the life of the brushes and the commutator of the electric motor.

A further object of my invention is to provide a brush holder and support of simple construction which will insure the correct and permanent positioning of the brush holder.

What I consider to be novel, and my invention may be better understood by reference to the following specifications and appended claims when considered in connection with the accompanying drawing in which:

Fig. 1 is a plan view of a portion of an electric motor with my improved brush holder and support;

Fig. 2 is an end view of the motor with the brush holder;

Fig. 3 is an exploded view of the brush holder, brush, and locking plate;

Fig. 4 is a detail view of the locking plate, and

Fig. 5 is a detail view of a portion of the brush assembly.

Referring to the drawing, 10 indicates an electric motor having an end shield 11 in which a brush holder 12 is mounted. Brush holder 12 consists of a metal insert 13 and a body 14 of moulded plastic material. Insert 13 has a substantially rectangular bore 15 in which a brush 16 is carried. Connected to brush 16 is a spring 17 which serves to provide the desired brush pressure to maintain it in contact with the commutator of the motor armature, not shown. To the opposite end of spring 17, a terminal 18 is secured. Terminal 18 is electrically connected to the brush 16 by means of a shunt 19. To secure the brush 16 in the brush holder 12, terminal 18 is provided with two integral guide members 20 and 21 which fit into sides of rectangular bore 15 of insert 13 and down-turned terminal lug 22 which rests on the outside of insert 13 and is positioned between two projections 23 and 24 of body member 14. Lug 22 has an opening 25 through which a screw 26 passes entering a screw threaded opening 27 of insert 13. Screw 26 serves the dual purpose of securing brush 16 and its connected parts in brush holder 12 and also connecting an electrical lead 28 to the brush 16, as better indicated in Figs. 1 and 2. Terminal member 18 is provided with a central inwardly extending boss 29, as best indicated in Fig. 5, which serves as a positioning means for the spring 17. The center of boss 29 is pierced for the entrance of shunt 19 which is soldered therein, as indicated at 30. Terminal member 18 with its integral guide members 20 and 21 and lug 22 provides a convenient means for assembling and securing the brush 16 in the holder 12 and an efficient terminal for conductor or lead 28 at the same time reducing the number of parts comprising the brush and holder assembly to a minimum.

For securing the brush holder 12 in end shield 11, a locking plate 31 of spring metal or resilient material is provided having a central opening 32 and two end openings 33. Locking plate 31 is of dished shape, as better indicated in Fig. 4. For positioning locking plate 31 on brush holder 12, opening 32 is provided conforming to the shape of the top of body member 14 and having two notches 34 which engage the projections 23 and 24 of body member 14. After the brush and its connected parts are secured in brush holder 12, the assembly is inserted in an opening 35 provided therefor in end shield 11. The brush holder rests on a flange 36 of the body member 14 in engagement with the portion of end shield 11 around the opening 35. The locking plate 31 is then passed over the top of body member 14 and secured against the flange 36 by means of two screws 37 which pass through openings 33. The screws 37 are threaded into end shield 11 and are tightened until the plate 31 is substantially flat. The electrical conductor 28 is then connected to the brush 16 by means of binding screw 26.

In the operation of an electric motor, vibrations are produced which tend to loosen the screws which hold the brush holder in the end shield. When these screws are loosened, the brush holder tends to chatter or may slightly shift its position and affect the operation of the electric motor. Movement or chattering of the brush holder produces an arc between the brush and the commutator of the motor. This increases the wear of the brush and pits the surface of the commutator, thus shortening the life of the motor. To overcome this difficulty, my improved brush holder is supplied with resilient locking plate 31 of dished shape so that when one or the other of the securing screws 37 becomes loosened, the locking plate 31 which has been tightened until it is substantially flat, bends slightly maintaining the brush holder 12 securely in position in opening 35 and producing a force tending to prevent a further loosening of the screws 37.

By providing the locking plate 31 of spring metal and in dished shape, the screws 37 may loosen a considerable amount before there is any tendency for the brush holder 12 to chatter or shift its position. Also the plate 31 acts as a lock washer for the screws 37 and thus reduces the tendency for the screws to loosen.

From the foregoing, it may be seen that an improved brush holder support is provided of simple construction which lengthens the life of the electric motor by insuring a permanent rigid positioning of the brush holder. In addition, the brush holder assembly consists of a minimum number of parts easy to manufacture and assemble.

What I claim is:

1. In an electric motor, a brush, a holder for said brush having a flange resting around an opening in said motor, and a clamping plate engaging said flange for securing said holder to said motor and being biased to a dish shaped form.

2. In an electric motor, a brush, a holder for said brush having a flange resting around an opening in said motor, and a clamping plate of spring metal engaging said flange for securing said holder to said motor and being biased to a dish shaped form.

3. In an electric motor, a brush, a holder for said brush having a flange, a plate of resilient material having an opening permitting the plate to pass part way over said holder into engagement with said flange, and means for securing said plate to said motor.

4. In an electric motor, a brush of rectangular cross section, a holder for said brush having a rectangular bore, a spring secured to said brush at one end, a shunt connected to said brush, a terminal member having depending guide members engaging the sides of said rectangular bore, and a screw for securing said terminal member to said holder and for connecting a conductor to said brush.

5. In an electric motor, a brush of rectangular cross section, a holder for said brush having a rectangular bore, a spring secured to said brush at one end, a shunt connected to said brush, a terminal member having depending guide members engaging the sides of said rectangular bore and a terminal lug, and a screw for securing said terminal member to said holder and for connecting a conductor to said terminal lug.

6. In an electric motor, a brush, a holder for said brush, a spring secured to said brush at one end, a shunt connected to said brush, a terminal member having integral guide members engaging said holder and a terminal lug overlying a portion of said holder, and a screw for securing said terminal member to said holder and for connecting a conductor to said brush.

7. In an electric motor, a brush, a holder for said brush, a spring secured to said brush at one end, a shunt connected to said brush, a terminal member having depending guide members and a terminal lug connected to said shunt and secured to said spring, means for securing said terminal member to said holder, and a locking plate of resilient material for securing said holder to said motor.

FERMAN C. DOUGHMAN.